Nov. 15, 1955                A. J. ROUBAL                2,723,814
COMBINED SUPPORT AND VIBRATION DAMPER
FOR A VIBRATORY BODY
Filed May 29, 1953
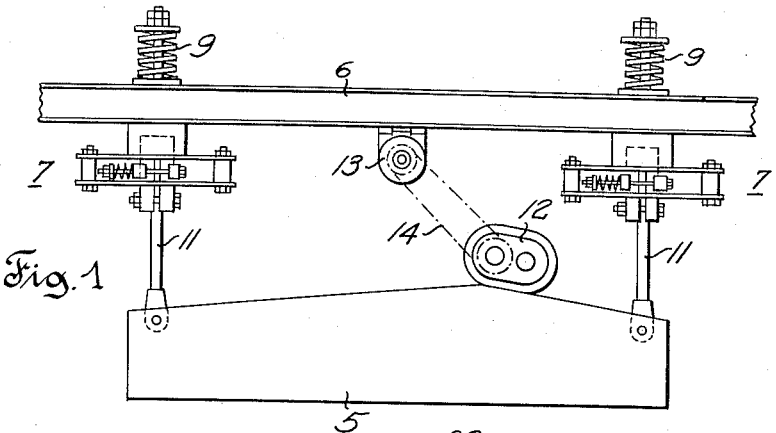
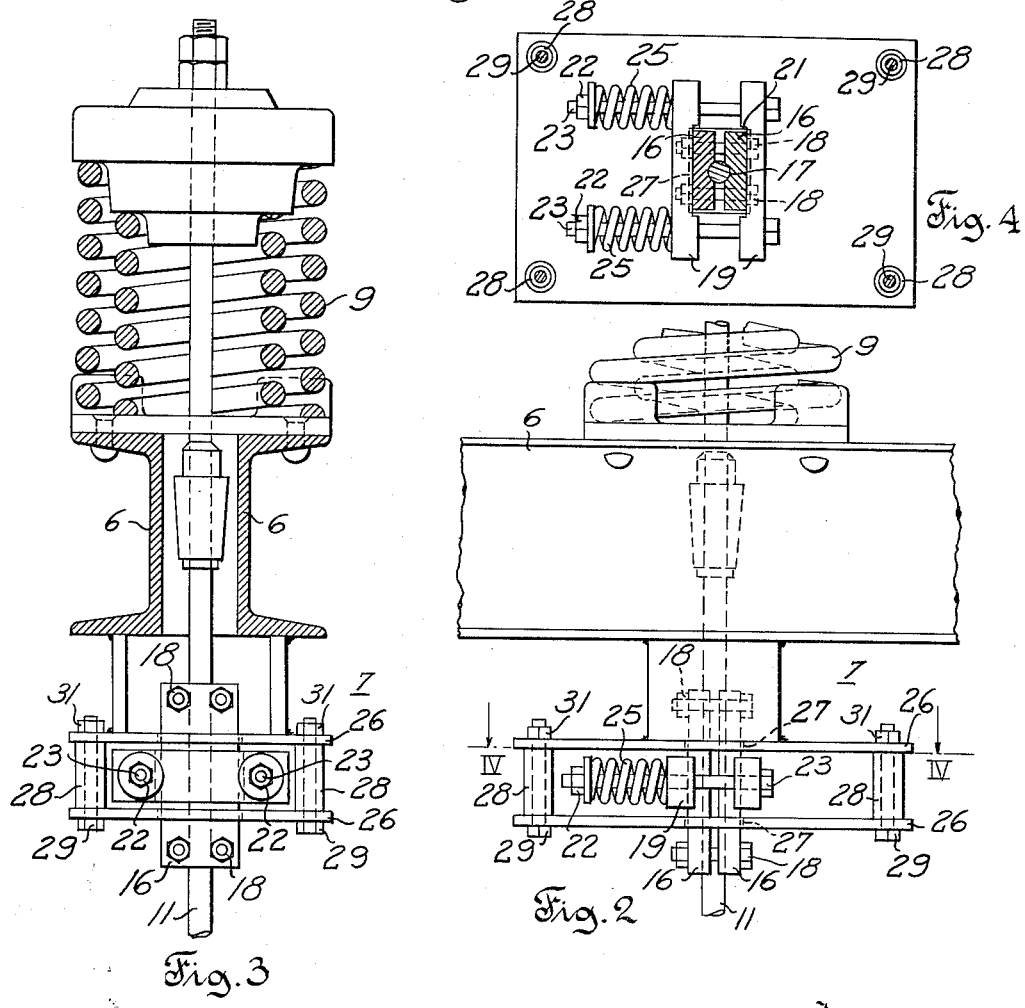
Inventor
Alexander J. Roubal
by John Stevens Lieb
Attorney

United States Patent Office 2,723,814
Patented Nov. 15, 1955

2,723,814

COMBINED SUPPORT AND VIBRATION DAMPER FOR A VIBRATORY BODY

Alexander J. Roubal, Milwaukee, Wis., assignor to Allis-Chalmers Manufacturing Company, Milwaukee, Wis.

Application May 29, 1953, Serial No. 358,289

4 Claims. (Cl. 248—18)

This invention relates generally to means capable of supporting and limiting the amplitude of vibration of a vibratory body and more specifically to a combined support and vibration damper for a vibratory body.

Vibratory bodies, such as vibrating screens, are usually vibrated at a frequency higher than the natural frequency of the vibrating mass of the body. When starting and stopping vibrating screens or machines of this type, it is necessary to accelerate and decelerate the rotary mechanism through a critical speed range which includes the natural frequency of the vibrating system. At such critical speeds, the machine will commence to vibrate erratically, or plunge at abnormally large amplitudes endangering the drive, the mounting and supporting structure, and the vibrating body. Corrective measures have been applied in the prior art to damp out or snub such transient vibrations and prevent the building up of disastrous inertia forces. The damping or snubbing devices used in the prior art have been built independent of the supporting structure of the vibrating machine and have had most utility in conjunction with floor supported machines. This type of snubbing system can become costly since it requires both a supporting structure for the vibrating body and a structure securing the damping device to the vibrating body. Also, in ceiling suspended vibrating machines, particularly where the machine is installed in a building which does not have a concrete floor, or the machine is installed at a considerable height above the floor, the installation of prior art snubber devices requires the erection of a suitable foundation and supporting structure beneath the machine which is costly and in many cases prohibitive.

The nature of the present invention resides in the provision of a combined support and vibration damper for vibrating machines, particularly the flexible cable suspended type, that eliminates the foregoing disadvantages of the prior art snubbing system.

It is therefore an object of the present invention to provide an improved means for supporting and for limiting the amplitude of vibration of a vibrating machine.

Another object of the invention is to provide an improved vibration damping system for a vibrating machine that is more economical and compact than present known damping systems.

Another object of the invention is to provide a supporting arrangement for a vibrating machine in which a support and a vibration damper are combined into a single structure.

Another object of the invention is to provide a combined support and vibration damper for a vibrating machine that is more simply and conveniently installed than present known damping systems.

The following is a description of a practical embodiment of the invention and the preferred mode of making, constructing and using the invention having the foregoing objects and advantages which will become apparent from a reading of the specification and the accompanying drawings in which:

Fig. 1 is a view in front elevation of a combined support and vibratory damper in a vibrating screen embodying the invention;

Fig. 2 is a fragmentary enlarged view of the combined support and vibratory damper shown in Fig. 1;

Fig. 3 is a side view partly in section of the combined support and vibratory damper shown in Fig. 2; and Fig. 4 is a section taken along line IV—IV of Fig. 2 showing a part of the vibratory damper.

Fig. 1 of the drawing illustrates a conventional vibrating screen 5 suspended from a suitable support member such as a pair of channels 6, only one of which is shown.

The screen 5 is caused to vibrate by a rotary vibrating mechanism 12 mounted thereon. The mechanism 12 is driven by an electric motor 13 mounted on a channel 6 through a multiple V-belt drive 14.

The screen 5 is supported on channels 6 for vibratory movement relative thereto by means of a plurality of combined support and vibration damper structures 7.

Each combined support and vibration damper structure 7 which comprises a support element 11 connecting a corner of the screen 5 with channel 6 through a spring 9. The support element 11 is a tension element maintained in tension at all times by the weight of the vibrating body and may be a flexible cable or a resilient rod.

Attached securely to the support element 11 is a first clutch means comprising a pair of oppositely facing bars 16, one on each side of the support element 11. Each of the bars 16 has a groove 17 on one of its faces and when the bars 16 are properly positioned, the grooves 17 are in alignment with one another to define a passageway into which the support element 11 at least partially fits. The bars 16 are held in engagement with the support element 11 by any suitable means such as by nuts and bolts 18.

The combined support and vibration damper structure 7, in addition, comprises a second clutch means cooperating with the first clutch means to form a variable friction means. The second clutch means comprises a pair of oppositely spaced horizontally extending members 19, one member being positioned adjacent the outer face of one of the bars 16 and the other member being positioned adjacent the outer face of the other of the bars 16. The members 19 have slots 21 in their opposing faces, the slots extending from top to bottom of each bar in the same direction as the supporting element 11. Each slot 21 has a width slightly larger than the width of the complementary bar 16 which fits into the slot. Although the slot 21 in each member is desirable, it may be omitted. The members 19 when properly positioned have their slots 21 in alignment to define a channel into which the first clutch means is fitted. The members 19 are biased into variable frictional engagement with bars 16 by means of a plurality of spring means, each comprising a coil spring 25 having one end in engagement with one of the members 19 and the other end connected through a bolt 23 and retaining nut 22 to the other of the members. The member 19 against which one end of each spring 25 engages is loosely connected with each bolt 23 so that the member 19 may be urged by the spring 25 toward the other member 19. The degree of slidability or friction between the surfaces of the bars 16 and the surfaces of the complementary members 19 in contact therewith is regulated by the tension of the coil springs 25 which may be varied by advancing or retracting the retaining nut 22 relative to the bolt 23.

When the bars 16 and members 19 are made of the same material, the rubbing surfaces tend to bind or stick when in use which is undesirable. To prevent the friction surfaces from galling or sticking, it has been found desirable to use dissimilar metals or metal and plastic for the respective rubbing surfaces. It is also possible to improve the friction characteristic by having brake lining or similar material (not shown) securely fastened by rivets or similar means to one of the rubbing surfaces.

Each combined support and vibration damper 7, in addition, comprises a lost motion spacer element comprising a pair of plates 26 spaced in parallel relation. One of the plates 26 is securely fastened by means such as welding to a suitable support member such as channel 6. The other of the plates 26 is disposed in register below the first plate 26 and spaced a predetermined distance therefrom by means of bushings 28 interposed between the plates at the corners thereof. The bushings 28 are held in place against the plates 26 by bolts 29 passing through suitable holes in the plates and by nuts 31. The plates 26 have openings 27 in register through the centers thereof large enough to permit the free passage of the support 11 and the bars 16 of the first clutch means. The distance between the plates 26 is maintained slightly larger than the sum of the width of the member 19 of the second clutch means and the amplitude of vibration of the particular machine, normal amplitude of vibration being defined as the vertical distance through which the vibratory body moves under normal operation. The lost motion between the member 19 of the second clutch means and the spacer plates 26 is slightly greater than the normal predetermined amplitude of vibration of the vibratory body to permit the vibratory body to vibrate without the member 19 of the second clutch means striking the spacer plates 26. Bushings 28 of different lengths may be used to vary the lost motion so that it is slightly larger than the normal predetermined amplitude of vibration of the particular machine. Close tolerance is required at this point so that the damping is effected as soon as the amplitude of vibration exceeds the normal predetermined amount.

In normal operation, the support 11 and first and second clutch means attached thereto vibrate with the vibrating screen 5 without the members 19 of the second clutch means engaging the plates 26 of the lost motion spacer element. The amplitude of vibration of the screen 5 is slightly less than the lost motion between the members 19 and the spacer plates 26 so that the members 19 do not engage the plates 26. When the screen 5 passes through a critical vibration point in speeding up or slowing down, the amplitude of vibration increases to such a degree that the members 19 engage the plates 26 to move the members 19 on the bars 16 of the first clutch means. This movement is opposed by friction between the bars 16 of the first clutch means and the members 19 of the second clutch means, the friction being a function of the pressure exerted by the coil springs 25 tending to force the members 19 and bars 16 together. This frictional force effectively dampers the vibration to prevent the vibratory body from plunging or vibrating at magnified amplitudes.

The members 19 engage the lost motion means or plates 26 only when the amplitude of vibration of the vibrating body is greater than the normal amplitude of vibration. When the vibrating body moves upward beyond the normal magnitude of vibration the upper plate 26 engages and stops the members 19 and causes them to slide relatively downward on the upwardly moving bars 16, thereby limiting the upward movement of the vibratory body. When the vibrating body moves downward beyond the predetermined magnitude of vibration, the lower plate 26 in turn engages and stops the members 19 and causes them to slide relatively upward on the downwardly moving bars 16, thereby limiting the downward movement of the vibratory body. If the magnitude of vibration then gradually decreases, the distance the members 19 move on the bars 16 gradually decreases until the second clutch means vibrates between the plates 26 without hitting either plate. The second clutch means does not necessarily return to a center point but it is not essential that the members 19 return to a center point so long as they oscillate between the plates 26 without hitting either plate.

It is to be understood that it is not intended to limit the invention to the exact details of construction, combination, and/or operation herein set forth for purposes of illustration as various modifications falling within the scope of the appended claims may occur to persons skilled in the art.

It is claimed and desired to secure by Letters Patent:

1. In a combined support and vibration damper for a vibratory body resiliently supported by a structure and normally being vibrated at a predetermined amplitude of vibration, the combination comprising: a flexible support for said vibratory body, said support comprising resilient means mounted on said structure and a cable having its upper end suspended from said resilient means and its lower end fastened to said vibratory body; friction means attached to said cable between said resilient member and said vibratory body and vibratable with said cable in response to the vibratory movement of said body, and lost motion means mounted on said structure in such a position as to engage said friction means in response to vibratory movement of said vibratory body exceeding the said predetermined amplitude of vibration to limit said vibratory movement.

2. In a combined support and vibration damper for a vibratory body resiliently supported by a structure and normally being vibrated at a predetermined amplitude of vibration, the combination comprising: a flexible support for said vibratory body, said support comprising resilient means mounted on said structure and a tension element having its upper end suspended from said resilient means and its lower end fastened to said vibratory body; friction means attached to said tension element and vibratable with said tension element in response to the vibratory movement of said vibratory body; and lost motion means mounted on said structure in such a position as to engage said friction means in response to vibratory movement of said vibratory body exceeding its said predetermined amplitude of vibration to limit said vibratory movement.

3. In a combined support and vibration damper for resiliently supporting on a structure a vibratory body normally being vibrated at a predetermined amplitude of vibration, the combination comprising: a flexible support for said vibratory body, said support comprising resilient means mounted on said structure and a tension element having its upper end suspended from said resilient means and its lower end fastened to said vibratory body; variable friction means comprising a pair of members in spaced relation, a pair of bars attached to said tension element, and biasing means including a spring for urging said members toward one another and into frictional engagement with said bars to cause said variable friction means to vibrate with said tension element in response to vibratory movement of said body; and lost motion means mounted on said structure in such a position as to engage opposite portions of said members in response to vibratory movement of said vibratory body exceeding said predetermined amplitude of vibration to cause said members to slide relatively to said bars to limit said vibratory movement.

4. In a combined support and vibration damper for resiliently supporting on a structure a vibratory body normally being vibrated at a predetermined amplitude of vibration, the combination comprising: a flexible support for said vibratory body, said support comprising resilient means mounted on said structure and a cable having its upper end suspended from said resilient means and its lower end fastened to said vibratory body; a first clutch means comprising a pair of bars secured to said cable between said resilient means and said vibratory body; a second clutch means comprising a pair of members in spaced relation, biasing means including a spring for urging said members toward one another and into frictional engagement with said bars of said first clutch means to cause both said clutch means to vibrate with said cable in response to vibratory movement of said body, and lost motion means comprising a pair of plates in spaced relation mounted on said structure in such a position as to engage opposite portions of said members in response to vibratory movement of said vibratory body exceeding said predetermined amplitude of vibration to cause said members to slide relatively to said bars to limit said vibratory movement.

References Cited in the file of this patent

UNITED STATES PATENTS

| | | |
|---|---|---|
| 1,454,238 | Kaufman | May 8, 1923 |
| 2,595,135 | Greenslade | Apr. 29, 1952 |

FOREIGN PATENTS

| | | |
|---|---|---|
| 621,841 | Great Britain | Apr. 21, 1949 |